United States Patent [19]

Hoshiyama

[11] Patent Number: 5,560,751
[45] Date of Patent: Oct. 1, 1996

[54] METHOD FOR DYEING AN OPTICAL COMPONENT

[75] Inventor: Seiichirou Hoshiyama, Kanagawa, Japan

[73] Assignee: Nikon Corporation, Tokyo, Japan

[21] Appl. No.: 466,182

[22] Filed: Jun. 6, 1995

Related U.S. Application Data

[63] Continuation of Ser. No. 190,980, Feb. 3, 1994, abandoned.

[30] Foreign Application Priority Data

Feb. 4, 1993 [JP] Japan ................... 5-039303

[51] Int. Cl.$^6$ .................. D06P 3/00; D06P 5/20
[52] U.S. Cl. .................. 8/506; 8/444; 8/495; 8/507; 8/930; 8/933; 427/164
[58] Field of Search .................. 8/444, 506, 507, 8/115.52, 933, 495, 930, 581; 427/164; 351/159, 162, 166

[56] References Cited

U.S. PATENT DOCUMENTS

| | | | |
|---|---|---|---|
| 4,101,302 | 7/1978 | Krohn et al. | 65/30 R |
| 4,148,939 | 4/1979 | Korjukin et al. | 427/164 |
| 4,155,734 | 5/1979 | Krohn | 65/30 R |
| 4,156,626 | 3/1979 | Souder | 156/272 |
| 4,289,497 | 9/1981 | Hovey | 8/506 |
| 4,589,884 | 5/1986 | Gilpatrick | 8/933 |
| 4,710,199 | 12/1987 | Suter | 8/507 |
| 5,096,457 | 3/1992 | Nakagawa et al. | 8/506 |

FOREIGN PATENT DOCUMENTS

| | | |
|---|---|---|
| 3525506 | 2/1986 | Germany . |
| 11421 | 2/1981 | Japan . |
| 72203 | 4/1986 | Japan . |
| 84015 | 4/1986 | Japan . |
| 19118 | 1/1993 | Japan . |

OTHER PUBLICATIONS

JP 61-72203, Apr. 14, 1986, Matsushita Electrical Industrial Co., Ltd. English Language Translation.

*Primary Examiner*—Paul Lieberman
*Assistant Examiner*—Caroline L. Dusheck
*Attorney, Agent, or Firm*—Keck, Mahin & Cate

[57] ABSTRACT

A method for dyeing an optical component such as a lens or filter. A coating of dyeing solution is formed on a surface of a lens and the lens is subjected to a nonuniform heating treatment in dependence on the position within the surface to obtain the desired color density gradient of the lens. In accordance with the positions within such surface, a nonuniform integrated heating amount distribution provides the desired color density gradient with excellent reproducibility.

17 Claims, 7 Drawing Sheets

METHOD FOR DYEING AN OPTICAL COMPONENT

This is a continuation application of Ser. No. 08/190,980, filed on Feb. 3, 1994, now abandoned.

BACKGROUND OF THE INVENTION

1. Field of the Invention

The present invention relates to a method for dyeing an optical component such as an eyeglass lens or optical filter.

2. Description of the Prior Art

As for example, there has been a great demand for colored eyeglass lenses as articles which are associated with the current fashion and style and are high in added value. In accordance with conventional lens coloring techniques, it has been the practice to repeat a plurality of times the operation of preparing a dyeing solution by dispersing a dye in a mainly water-type dispersion medium, maintaining the resulting dyeing solution at a temperature of 100° C. or less under the atmospheric pressure, dipping a lens in the dyeing solution in this condition and taking out the lens from the solution thereby effecting the dyeing with the desired color tone and color density. In this case, generally it has been frequent to perform a so-called half coloring in which about one half of the area extent of a lens surface is dyed with a gentle color density gradient so as to gradually decrease the color tone toward the center of the lens.

However, the dyeing of optical components by the conventional method of the above-mentioned type is disadvantageous in that to obtain the desired color tone and color density tends to have recourse to the long experience of a dyeing operator, and particularly where the dyeing with a gentle color density gradient is effected, the reproducibility of products of the same finish is deteriorated and it is difficult to prevent variations in the color density due to the following processing operations such as a protective coating.

SUMMARY OF THE INVENTION

It is the primary object of the present invention to provide a method for dyeing optical components which overcomes the foregoing deficiencies in the prior art, is excellent in the reproducibility of dye finish and is capable of performing a stable dyeing, and more particularly such method well suited for the mass production of dyed optical lenses.

To accomplish the above object, in accordance with a basic aspect of the present invention there is thus provided a method for dyeing an optical component including a step of applying a nonuniform heating to the surface of an optical component covered with a dye coating in dependence on the position within the surface, and the nonuniform heating is controlled so as to obtain an integrated heating amount distribution corresponding to a predetermined color density gradient whereby depending on the position within the surface the amount of the dye penetrating to the interior of the optical component is varied in accordance with the color density gradient. Thereafter, the optical component is cleaned and then post processing operations such as a protective coating are performed as occasion demands thereby producing the product.

In accordance with a preferred embodiment of the present invention, the heating is effected by the radiant heat from a heating source and during the control of the nonuniform heating the irradiation time of the radiant heat to the surface is varied depending on the position within the surface. In this case, preferably a heat shielding member is arranged between the radiation source and the surface so that during the control of the nonuniform heating the heat shielding member and the optical component are moved relative to each other and therefore the area of the irradiated region by the radiant heat with respect to the surface is varied with time.

In accordance with another preferred embodiment of the present invention, the heating is effected by the radiant heat from a heating source, and during the control of the nonuniform heating the heat irradiation distance from the heating source to the surface is varied in dependence on the position within the surface.

In the optical component dyeing method according to the first embodiment of the present invention, the optical component which is to be subjected to the dyeing is for example a lens and a dye coating is formed by a coating or transfer film of a dye solution on the surface of a substrate constituting the lens. The lens surface including the dye coating is then subjected to a heat treatment so that during the heat treatment the dye from the dye coating penetrates into the substrate and thus the lens is dyed. In this case, the dye penetrates into the lens substrate in an amount corresponding to the integrated amount of heat applied to the surface of the lens substrate so that by controlling the integrated amount of heat applied to the substrate surface in dependence on the position within the surface, it is possible to produce a colored lens having the desired color density gradient.

In other words, in proportion to an increase in the integrated amount of heat applied to the surface covered with the dye coating the amount of the dye penetrated into the substrate from the surface coating is increased and the color density is increased, whereas in proportion to a decrease in the integrated amount of heat applied the amount of the penetrated dye is decreased and the color density is decreased. In accordance with the present invention, on the basis of this corresponding relation between the color density and the integrated heating amount, the nonuniform heating is controlled so as to obtain an integrated heating amount distribution corresponding to the desired color density gradient with the result that there is no need to have recourse to the experience of the operator and it is possible to relatively easily produce a dyed optical component having the desired color density gradient pattern according to the designing.

Further, since the present invention utilizes such relation between the integrated heating amount and the color density, the reproducibility for the color density gradient pattern of finished products in extremely improved among a plurality of production lots than previously and thus there is the advantage that not only in cases where dyed lenses of the same color density gradient pattern are mass produced but also in cases where dyed lenses of many different color density gradient patterns are produced, the control of the nonuniform heating is easy and moreover the unmanned operation and automated operation of the dyeing process are made possible thereby realizing an improved efficiency of the production processing on the whole.

In accordance with the present invention the heating may be effected by the radiant heat from a heating source so that in accordance with an embodiment, the irradiation time of the radiant heat onto the surface during the control of the nonuniform heating is varied in dependence on the position within the surface. In this case, the irradiation of heat is effected for a relatively long period of time to the portion of the optical component surface which is to be increased in color density, whereas the irradiation of heat is effected for a relatively short period of time to the portion which is to be decreased in color density. Thus, by differing the heat irradiation time depending on the portion to be dyed, it is possible to easily provide the integrated heat amount distribution required for producing the desired color density gradient pattern.

Further, in accordance with another embodiment, during the control of the nonuniform heating the heat irradiation distance from the heating source to the surface is varied in dependence on the position within the surface. In this case, even if the heat irradiation time is the same for the whole surface of an optical component which is to be dyed, by inclining the surface at a predetermined angle with respect for example to the irradiation direction of the radiant heat so that the distance from the heating source is varied depending on the portion which is to be dyed thus causing the portion to be increased in color density to come relatively near to the heating source and causing the portion to be decreased in color density to be relatively apart from the heating source, it is possible to vary the distance from the heating source depending on the portion to be dyed and thereby to easily provide the integrated heating amount distribution required for producing the desired color density gradient pattern.

Further, in accordance with still another embodiment, the surface of the optical component is partly immersed into, a liquid heating medium so as to be nonuniformly heated by the medium, and the immersed portion of the surface is selectively heated by the medium during the liquid level position on the surface being periodically and continuously changed.

In accordance with the present invention, it is of course possible to vary the irradiation time of the radiant heat and the distance from the heating source in combination depending on the portion to be dyed within the optical component surface.

In accordance with the present invention, the optical component subjected to the dyeing may be of any type provided that it is made of a substrate which permits the dye deposition by heating and a lens, filter, prism, mirror or the like may be cited as an example. Also, while there is no limitation to the suitable materials for the substrate, if, for example, a plastic material is used for the substrate, various optical plastic materials, e.g., polymethylmethacrylate and its polymer, acrylonitrile-styrene copolymer, polycarbonate, cellulose acetate, polyvinyl chloride, polyethylene terephthalate, epoxy resin, unsaturated polyester resin, polyurethane, CR-39 polymer (trade name) may be used as the suitable plastic materials.

As the heating source used with the present invention, various types of heating sources, e.g., irradiation sources such as infrared and/or visible light irradiation sources, hot air source, microwave irradiation source and heat-transfer fluid caw be used, and in any way the essential requirement is that heating conditions which would not cause heat deterioration of the substrate can be established.

Also, the dye solution for forming a dye coating on the surface of the substrate is not limited to those shown in the examples which will be described later and dye solutions of different compositions can be used. Generally, the dye solution contains a dye, a solvent for dissolving the dye, a film-forming ingredient, an anticlouding and leveling agent, and a surface-active agent which will be added in case of need.

The suitable substances for the solvent include for example tetrahydrofuran (THF), methanol, ethanol, isopropyl alcohol, trichloroethylene, methyl chloride, toluene, xylene, petroleum naphtha, acetone, methyl ethyl ketone, ethyl acetate, butyl acetate, furfural, ethyl ether and 1,4-dioxane. Where the substrate is made of a plastic material, however, it is of course necessary to use a solvent which dissolves the dye but not dissolves the plastic material.

Also, as the film-forming ingredient, it is possible to use for example cellulosic plastic such as cellulose acetate butyrate (CAB), cellulose acetate or cellulose nitrate; acrylic resin such as polymethyl methacrylate; vinyl resin such as polyvinyl chloride or polyvinyl acetal; polystyrene; polyester; polyurethane and epoxy resin.

As the anticlouding and leveling agent, it is possible to use for example butyl-B-oxyethyl ether, ethylene glycol monoethyl ether, ethylene glycol monophenyl ether, diethylene glycol monomethyl ether, diethylene glycol monoethyl ether, diethylene glycol monobutyl ether, ethylene glycol monomethyl ether acetate, ethylene glycol monoethyl ether acetate, ethyl lactate, n-butyl propionate, diacetone alcohol, cyclohexene, etc.

Also, as the surface-active agent, it is possible to use for example FC 431 (trade name); Fluorade Series (trade name: Sumitomo 3M KK); KP 322 (trade name: Shin-Etsu Silicone KK); Serfinol Series (trade name: Nissin Chemical Ind. Co.); Polyflow or Floren Series (trade names: Kyoeisha Oil and Fats Chemical Ind. Co., Ltd.); Modaflow or Multiflow (trade names: Monsant Co.); Dispalon Series (trade name: Kusumoto Chemical Co., Ltd.); Nopco Color Super Series, Nopco 1338, Modicall L or SN Thickener Series (trade names: San-Nopco Co., Ltd.); Rheotol (trade name: Vanderbilt AG); Thickener L (trade name: General Aniline Co., Ltd.); Latex Anti-crater LLBA (trade name: Troy Co., Ltd.); Pluronic Series (trade name: Wyandotte Co., Ltd.); Resiflow Series (trade name: SBS Chemicals Co., Ltd.), etc.

The dye used for dyeing is not limited to those shown in the examples which will be described later and various stock materials of disperse dye and oil-soluble dyes can be used. The following show examples of these materials.

More specifically, as the disperse dye, it is possible to use Color Index (C.I.) Disperse Yellow 5, 198, 83, 64, 54, 42, 149, 7, 56, 4, 3 and 33; C.I. Disperse Orange 49, 31, 13, 29, 61, 33 and 3; C.I. Disperse Red 72, 225, 73, 76, 54, 56, 205, 227, 135, 1 and 17; C.I. Disperse Violet 35, 1 and 38; C.I. Disperse Blue 106, 201, 183, 148, 128, 56, 214, 197, 87, 60, 102, 3, 1 and 7; and C.I. Disperse Brown 1, etc.

Also, the suitable materials for the oil-soluble dye include C.I. Solvent Yellow 19 and 77; C.I. Solvent Orange 1; C.I. Solvent Red 1, 111, 146 and 88; C.I. Solvent Violet 13 and 14; C.I. Solvent Blue 12, 35 and 36; C.I. Solvent Green 3; C.I. Solvent Brown 37; and C.I. Solvent Black 3, etc.

While, in the case of an eyeglass lens, for example, a scratch-proof coating is frequently formed on the lens surface, the dyeing process of the present invention can be conveniently performed at any point which is before or after the formation of the scratch-proof coating on the lens surface.

An organic silicon compound given by the following formula or its hydrolyzate or the like may for example be used as the suitable composition for such scratch-proof coating formed on the lens surface (where $R^1$ is a functional group or organic group having an unsaturated double bond and a number of carbon atoms of 4 to 14, $R^2$ is a hydrocarbon group or halogenated hydrocarbon group of 1 to 6 carbon atoms, $R^3$ is an alkyl group, alkoxyalkyl group or acyl group of 1 to 4 carbon atoms, and a and b are each 1 or 0 so that a+b=1 or 2.)

As the organic silicon compound given by formula (1), it is possible to use various epoxy silane compounds having an epoxy group as the functional group and they include for example the following Y-glycidoxypropyltrimethoxysilane, Y-glycidoxypropyltriethoxysilane, Y-glycidoxypropyltrimethoxyethoxysilane, Y-glycidoxypropyltriacetoxysilane, Y-glycidoxypropylmethyldimethoxysilane, Y-glycidoxypropylmethyldiethoxysilane, and β-(3,4-epoxycyclohexyl)ethyltrimethoxysilane, Also, as the organic silicon compound of formula (1), it is possible to use various trifunctional trialkoxysilane, triacyloxysilane and dialkoxyalkoxysilane compounds having no epoxy group and they include for example the following methyltrimethoxysilane; methyltriethoxysilane, vinyltrimethoxysilane, vinyltriethoxysilane, vinyltriacetoxysilane, vinyldimethoxyethoxysilane, Y-methacryloxypropyl trimethoxy silane, aminomethyl trimethoxy silane, 3-aminopropyl trimethoxy silane, 3-aminopropyl triethoxy silane, phenyltrimethoxysilane, phenyltriethoxysilane, Y-chloropropyl trimethoxy silane, Y-mercaptopropyl triethoxy silane, and 3,3,3-trifluoropropyl trimethoxy silane.

Also, as the organic silicon compound of formula (1), it is possible to use bifunctional silane compounds such as dimethyldimethoxysilane, diphenyldimethoxysilane, methylphenyldimethoxysilane, methylvinyldimethoxysilane and dimethyldiethoxysilane, preferably in mixed form with the previously mentioned trifunctional compounds.

Further, as the organic silicon compound of formula (1), it is possible to use tetrafunctional silicate compounds such as methyl silicate, ethyl silicate, isopropyl silicate, n-propyl silicate, n-butyl silicate, t-butyl silicate and sec-butyl silicate in mixed form with one or two of the previously mentioned compounds.

In order to increase the hardness of a protective coating to be formed, various finely-divided oxides can be added to these organic silicon compounds or their mixtures.

The above and other objects, features and advantages of the present invention will become more apparent from the following description of its preferred embodiments shown only for illustrative purposes without any intention of limitation when taken in conjunction with the accompanying drawings.

DESCRIPTION OF THE PREFERRED EMBODIMENTS

Figure 1A:
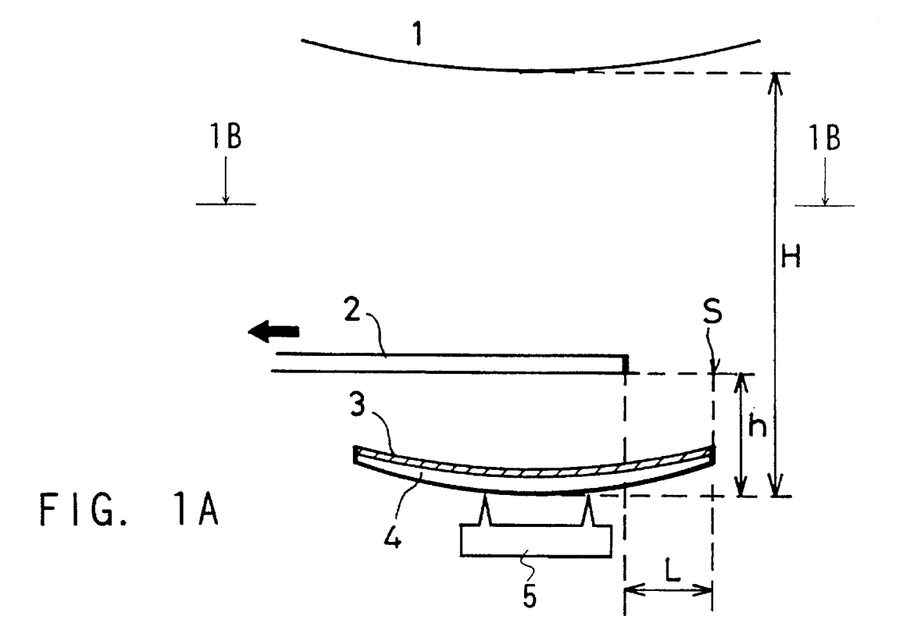
FIG. 1A is a side view schematically showing the manner in which the lens dyeing process is performed according to first, second and third embodiments of the present invention.
Figure 1B:
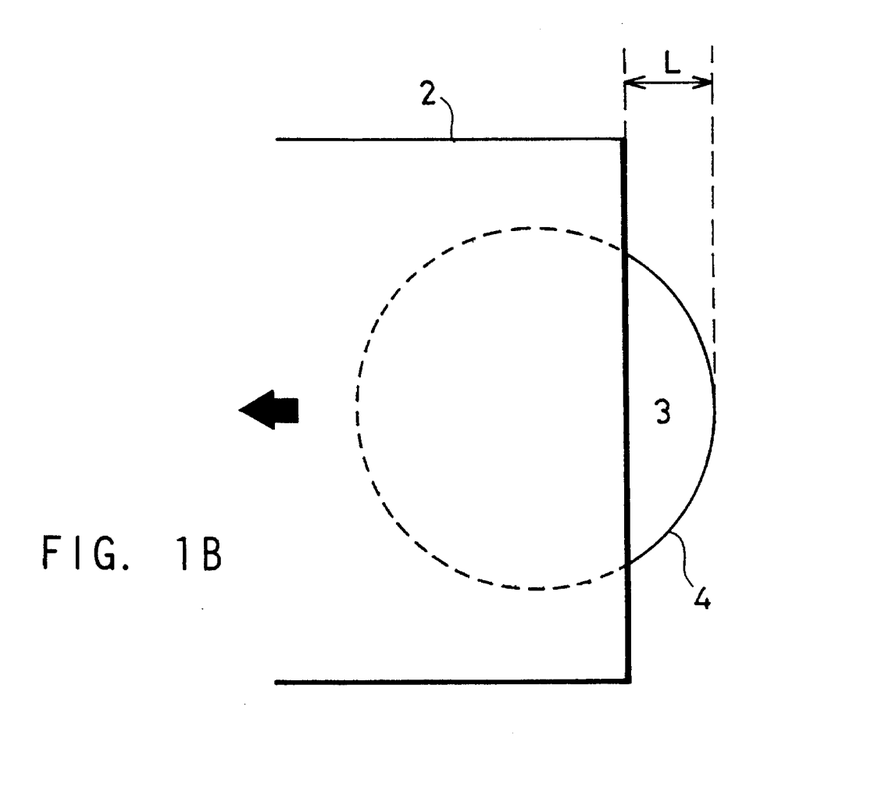
FIG. 1B shows the principal part looked from the direction of an arrow 1B in FIG. 1A.

First Embodiment:

In a first embodiment according to the present invention, as shown in FIG. 1, an infrared lamp 1 is used as a heating source, and a lens substrate 4 whose one surface is covered with a dye coating 3 is placed on a holding table 5. A movable heat shielding plate 2 is interposed between the infrared lamp 1 and the dye coating 3 of the lens substrate 4 so as to be slowly moved during the period of heating. In this way, the time of heat irradiation of the lens surface is nonuniformly controlled in relation to the position and the lens surface is heated with a controlled integrated heating amount distribution. While, in this case, the dye coating is preliminarily formed on the lens substrate 4 placed on the holding table 5, firstly the preparation of the dyeing solution used for the formation of the dye coating 3 in the present embodiment will now be described.

A. Preparation of dyeing solution composition:

(1) Preparation of diluting solution

A beaker with a rotor is charged with 87.60 weight % of tetrahydrofuran (THF) serving as a dye dissolving solvent, 2.65 weight % of cellulose acetate butyrate (CAB 381-2: trade name) as a film-forming agent, 9.50 weight % of butyl-β-oxyethyl ether (Btyl Cellosolve: trade name) as an anti-clouding agent and a leveling agent for the purpose of ensuring smoothness of the coating, and 0.25 weight % of a surface-active agent FC-431 (trade name) and then the substances are mixed by agitation at a room temperature of about 24° C. Then, the resulting mixture is filtered by a filter (3 μm) made of a tetrafluoroethylene resin and the filtrate is transfused and kept in a closed container made of glass.

(2) Preparation of dyeing stock solution R (red)

A beaker with a rotor is charged with 86.49 weight % of THF, 2.70 weight % of CAB 381-2, 9.74 weight % of Btyl Cellosolve, 0.26 weight % of FC-431 and 0.81 weight % of the dye C.I. Solvent Red 146, and the substances are mixed by agitation at a room temperature (about 24° C.). The resulting mixed solution is filtered by a filter (3 μm) made of a tetrafluoroethylene resin and the filtrate is transfused and kept in a closed container made of glass.

(3) Preparation of dyeing stock solution B (blue)

A beaker with a rotor is charged with 86.72 weight % of THF, 2.71 weight % of CAB 381-2, 9.77 weight % of Btyl Cellosolve, 0.26 weight % of FC-431 and 0.54 weight % of the dye C.I. Disperse Blue 56, and the substances are mixed by agitation at a room temperature (about 24° C.). The resulting mixed solution is filtered by a filter (3 μm) made of a tetrafluoroethylene resin and the filtrate is transfused and kept in a close container made of glass.

(4) Preparation of dye stock solution Y (yellow)

A beaker with a rotor is charged with 84.43 weight % of THF, 2.64 weight % of CAB 381-2, 9.51 weight % of Btyl Cellosolve 0.25 weight of FC-431 and 3.17 weight % of the dye C.I. Disperse Yellow 33, and the substances are mixed by agitation at a room temperature (about 24° C.). The resulting mixed solution is filtered by a filter (3 μm) made of a tetrafluoroethylene resin and the filtrate is transfused and kept in a closed container made of glass.

(5) Preparation of dyeing solution

The required dyeing solution for forming the dye coating 3 on the surface of the lens substrate 4 is prepared by mixing the dyeing stock solutions of the three primary colors Y (yellow), R (red) and B (blue) adjusted as mentioned above in the different proportions required for reproducing the desired color tone and diluting the mixture to the suitable color density by a dilute solution containing as a principal component the THF used in the preparation of the dyeing stock solutions.

In this first embodiment brown is selected for the color tone. The dyeing stock solution of the three primary colors are mixed with a compounding ratio of

Y:R:B=45:27:28 in volume proportion and the resulting brown stock solution is diluted to obtain a ratio of the brown stock solution: diluting solution =3:97 in volume proportion, thereby using the resulting solution as the desired dyeing solution.

Figure 2:
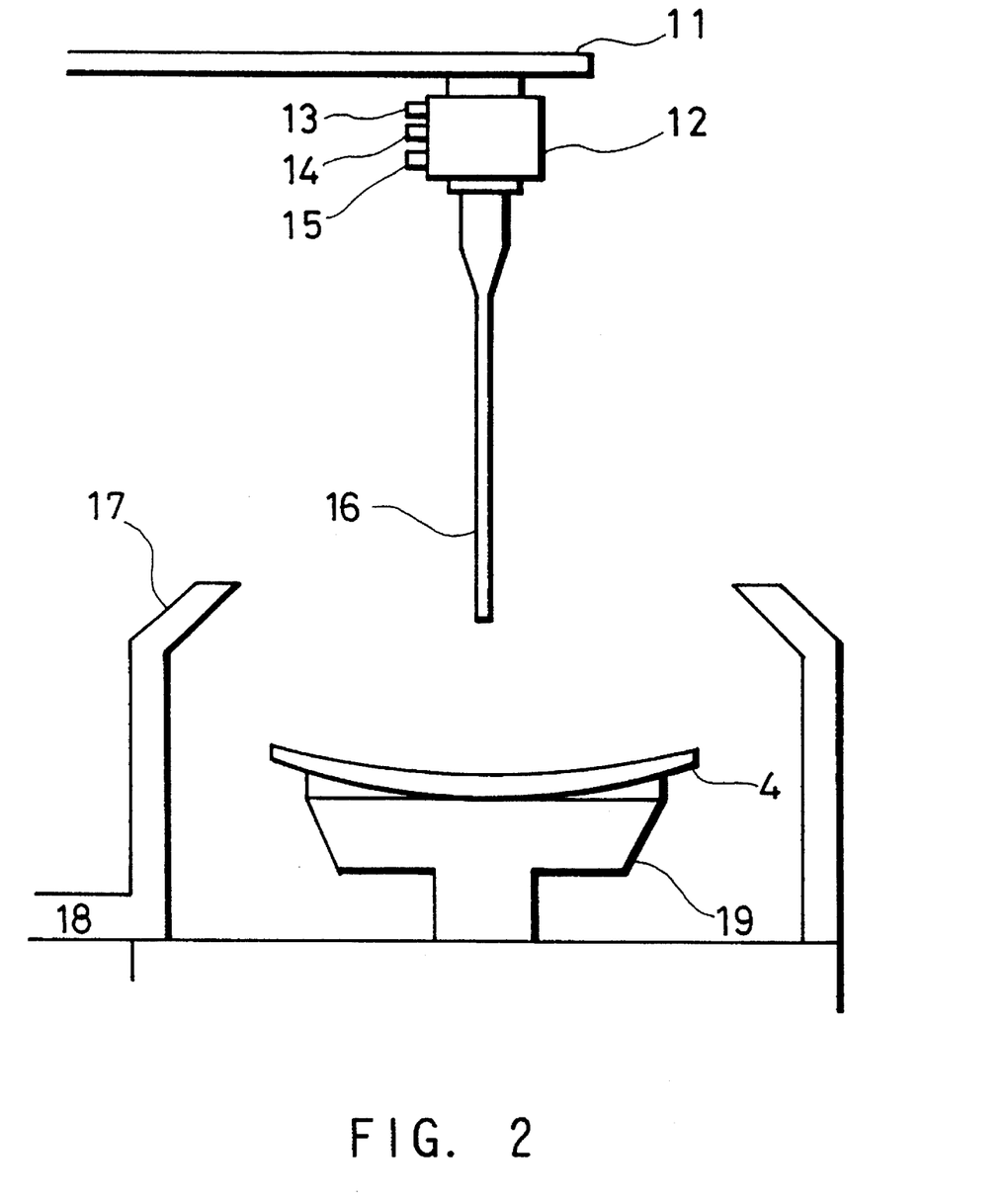
FIG. 2 is a schematic view showing the lens spinner used in the lens dyeing process according to the first, second and third embodiments of the present invention.

B. Formation of dye coating:

In the first place, the dyeing solution prepared from the brown stock solution and the diluting solution in the above-mentioned manner is applied to the surface of the eyeglass plastic lens substrate 4 made of the CR-39 polymer (trade name) and having a thickness of 2 mm and a diameter of 65 mm by means of the lens spinner and thus a dye coating is formed on the surface of the lens substrate 4.

More specifically, as shown in FIG. 2, the lens substrate is set, with its concave surface turned up, on the lens spinner 19 within an air jacket 17, and also the brown dyeing solution prepared as mentioned previously is introduced through an inlet port 15 to fill the chamber of a dropping valve 12. Valve operating pilot air is respectively supplied and exhausted through ports 13 and 14 so that the opening of the valve 12 is controlled and about 2 cm$^3$ of the dyeing solution is dropped on the lens concave surface from a dropping nozzle 16 which is dependent from the valve lower part. At the same time, the lens substrate 4 is first rotated at 1,000 rpm for 5 seconds and then at 2,000 rpm for 4 seconds by the lens spinner 19 thereby covering the concave surface of the lens substrate 4 with a dye coating 3 of the uniform thickness throughout its whole surface.

C. Heating treatment of dye coating:

Next, with its surface covered with the dye coating 3, the lens substrate 4 is heated by a heating unit using the infrared lamp 1 as its heat source as shown in FIG. 1 in such a manner that the integrated heating amount is nonuniformly distributed in accordance with the lens surface positions and thus the dye in the coating 3 is caused to adsorb into the lens substrate with a nonuniform distribution corresponding to the nonuniform integrated heating amount distribution which differs in amount from one location to another.

That is, under a condition that an equable radiant heat is radiated from the heat source to the heat radiation area corresponding to all over the lens surface, if a part of the lens surface to be heated is shielded by heat shielding means arranged between the lens and the heat source, there are produced heated part and nonheated part on the lens surface. In this specification, such a method for heating as mentioned above should be understood as a kind of "the nonuniform heating".

In this embodiment, in FIG. 1 the infrared lamp 1 is comprised of a type IR 100 V–250 WRH (rated voltage: 100 V, rated power: 250 W) manufactured by Toshiba Lighteck Co., Ltd. The infrared lamp 1 is turned on at the rated voltage and the interior of the heating unit including the movable heat shielding plate 2 is maintained in a thermally stable state by a sufficient preheating (warming-up). Also, the lens substrate 4 is placed on the holding table 5 in such a manner that its surface having the dye coating 3 formed thereon is turned up and the heat shielding plate 2 is interposed between the infrared lamp 1 and the dye coating 3 of the lens substrate 4. The distance (height) H from the bottom of the lens substrate 4 to the infrared lamp 1 may be set in the range of 80 mm to 120 mm and more preferably, it is designed to be 100 mm, so that enough heat amount can be obtained for heating the lens surface. In this embodiment, the distance H is maintained about 100 mm and the spacing (height) h from the bottom of the lens substrate 4 to the shielding plate 2 is maintained about 20 mm. Also, the diametrical distance L extending from one end S to the other end of the lens substrate 4 is selected to be a control parameter for the nonuniform heating. In the initially set condition, the heat shielding plate 2 is arranged so that its end is placed at the position of the distance L=20 mm, and the nonuniform heating is controlled in such a manner that the distance L is gradually increased in response to the movement of the heat shielding plate 2. As a result of this control, the movable heat shielding plate 2 is continuously moved at a speed of 1.43 mm/min in the diametrical direction indicated by the arrow in the Figure and in this way the lens substrate 4 is subjected to nonuniform radiation heating at 120° C. for a period of 35 min while gradually increasing the distance L.

Further, in this case, it is preferable to choose the heating time, to any dyeing portion of the lens surface, to be more than 1 min during the time of which the dyeing is made even a little, less than 40 min during the time of which dyeing is equilibrated, and the heating time beyond 40 min is substantially meaningless with respect to the dyeing process.

In fact, according to this embodiment, a half-colored lens with a smooth color density distribution has been acquired by the heating time of 35 min which is corresponding to about 90% of dyeing equilibrium.

After this heating treatment, the lens substrate 4 is removed from the holding table 5 and then the lens substrate 4 is successively cleaned by rocking it for a period of 1 minute in each of two cleaning tanks each being filled with methylene chloride of 20° C. Lastly, the lens substrate 4 is immersed in the methylene chloride vapor of 40° C contained in a hermetically sealed tank and it is cleaned for a period of 1 minute.

Figure 3:
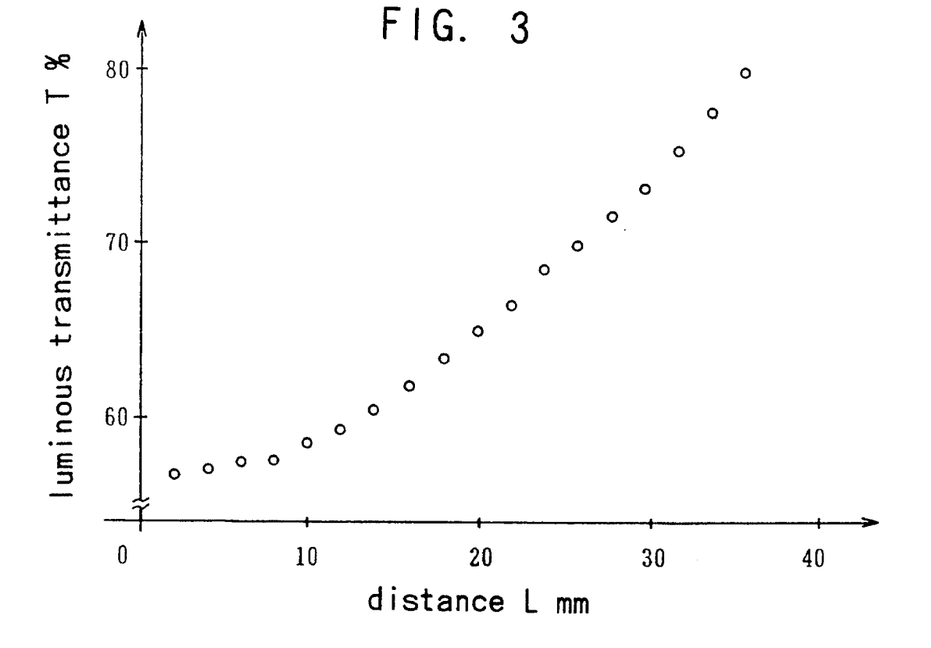
FIG. 3 is a graph showing the color density distribution in the surface of the dyed lens produced according to the first embodiment of the present invention, with the abscissa showing the diametrical distance L(mm) from one end to the other end of the lens substrate and the ordinate showing the luminous transmittance value T(%).

FIG. 3 shows the relation between the color density and the integrated heating amount of the dyed lens produced by the foregoing operation. In this case, since the radiation heat amount from the infrared lamp 1 and the travel speed of the shielding plate 2 are constant, the diametrical distance L (mm) from the one end S to the other end of the lens substrate is represented on the abscissa of FIG. 3 as a parameter indicative of the integrated heating amount received by the lens substrate. Also, the luminous transmittance value T (%) is represented as a color density evaluation criterion on the ordinate.

As will be seen from FIG. 3, with the thus produced dyed lens, the luminous transmittance T is increased with increase in the distance L from the end S. In other words, since the travel speed of the shielding plate 2 is constant, the heat irradiation time or the integrated heating amount is decreased as the distance L from the end S is increased and therefore the color density is gradually decreased (the coloring is lightened) with increase in the distance L. This relation between the integrated heating amount and the color density shows a substantially linear correlation with increase in the distance L starting at the position of the distance L=20 mm corresponding to the initially set position for the end of the shielding plate 2.

Second Embodiment:

In the second embodiment of the present invention, the dyeing process by nonuniform heating is performed on an eyeglass plastic lens substrate (NIKON LITE DXII:trade name) having a thickness of 2 mm and a diameter of 65 mm and different in material from that of the first embodiment. The dyeing solution used is the same brown dyeing solution as the first embodiment and a dye coating is formed on the lens substrate by the lens spinner shown in FIG. 2 under the same conditions as the first embodiment.

After the formation of the dye coating, as shown in FIG. 1, the lens substrate is set under the same initially set conditions in the same heating unit as the first embodiments and a movable shielding plate is continuously moved at a speed of 0.86 mm/min in the direction of an arrow in the Figure while being subjected to the radiation heating by an infrared lamp. In this way, the nonuniform radiation heating of the lens substrate is effected at 125° C. for a period of 54 min while gradually increasing the distance L.

Then, the lens substrate thus subjected to the heat treatment is cleaned by using the same lens spinner as used for the formation of the dye coating. The lens substrate is set on the lens spinner 19 so as to turn up the lens concave surface into which the dye has been adsorbed by the heat treatment, so that liquid methylene chloride filled in the cavity of the value 12 in place of the dyeing solution is dropped onto the lens concave surface from the dropping nozzle 16. Along with this dropping, the lens substrate is rotated by the lens spinner 19 at a speed of 1,000 rpm for a period of 4 seconds.

Figure 4:
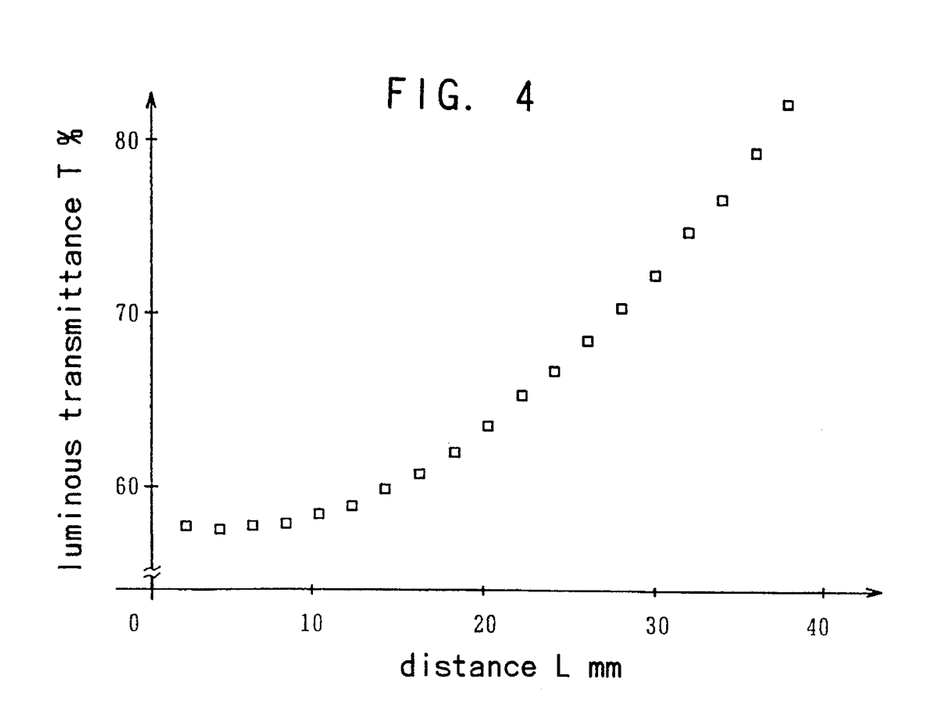
FIG. 4 is a graph showing the color density distribution in the surface of a dyed lens produced according to the second embodiment of the present invention, with the abscissa showing the diametrical distance L(mm) from one end to the other end of the lens substrate and the ordinate showing the luminous transmittance value T(%).

FIG. 4 shows the relation between the color density and the integrated heating amount of the resulting dyed lens. In the Figure, as in the case of FIG. 3 of the first embodiment, the abscissa represents the diametrical distance L from the one end S to the other end of the lens and the ordinate represents the luminous transmittance value T serving as a color density evaluation criterion. As will be seen from FIG. 4, the luminous transmittance is gradually increased with increase in the distance L from the end S, that is, as the heat irradiation time is decreased, and thus the color density is gradually decreased. In this case, the relation between the integrated heating amount and the color density also shows substantially a linear correlation with increase in the distance L from near the position of the distance L=20 mm corresponding to the initially set position of the end of the shielding plate 2.

Third Embodiment:

In the third embodiment of the present invention, a dyeing process by the nonuniform heating is performed on an eyeglass plastic lens substrate (NIKON LITE 3: trade name) of 2 mm thick and 65 mm diameter, which is different in material from those of the first and second embodiments. In the third embodiment, use is made of a dyeing solution which is different in color tone from those used in the first and second embodiments. In other words, in the preparation of the dyeing solution used in the third embodiment, the previously mentioned dyeing stock solutions Y, R and B of the three primary colors are mixed to attain a ratio of Y:R:B =73:17:10 in terms of a volume ratio and the mixed stock solution is diluted with a diluting solution containing the THF as its principal component so as to attain a ratio of the stock solution: the diluting solution =3:97 in terms of volume ratio.

In this way, using the dyeing solution prepared differently from the first and second embodiments, a dye coating is formed on the lens substrate by the lens spinner shown in FIG. 2 under the same conditions as the first and second embodiments.

After the formation of the dyeing coating, as shown in FIG. 1, the lens substrate is set under the same initially set conditions in the heating unit as the first and second embodiments so that along with the radiation heating by the infrared lamp, the movable shielding plate is continuously moved at a speed of 0.86 mm/min in the direction of an arrow in the Figure and thus the nonuniform radiation heating of the lens substrate is effected at 125° C. for a period of 54 min while gradually increasing the distance L.

After the heat treatment, the lens substrate is removed from the holding table and then it is successively cleaned by rocking it for a period of 1 minute in each of two cleaning tanks each being filled with methylene chloride of 20° C. Lastly, the lens substrate is cleaned by immersing it for a period of 1 minute in methylene chloride of 40° C. contained in a hermetrically sealed tank.

Figure 5:
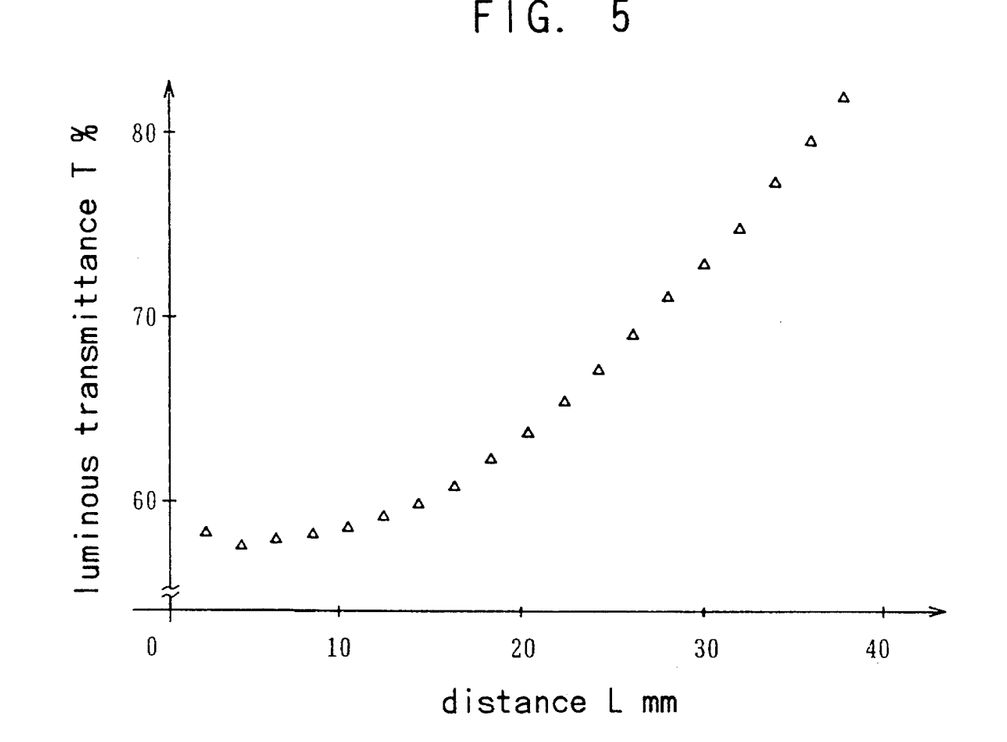
FIG. 5 is a graph showing the color density distribution in the surface of a dyed lens produced according to the third embodiment of the present invention.

FIG. 5 shows the relation between the color density and the integrated heating amount of the resulting dyed lens. In the Figure, as in the case of FIGS. 3 and 4 showing the first and second embodiments, respectively, the abscissa represents the diametrical distance L from the one end S to the other end of the lens and the ordinate represents the luminous transmittance value T as a color density evaluation criterion. As will be seen from FIG. 5, in proportion to an increase in the distance L from the end S or in proportion to a decrease in the heat irradiation time, the luminous transmittance is increased gradually and hence the color density is gradually decreased. In this case, the relation between the integrated heating amount and the color density also shows substantially a linear correlation with increase in the distance L from near the position of the distance L=20 mm corresponding to the initially set position for the end of the shielding plate 2.

From the foregoing description of the first, second and third embodiments it will be seen that the color density and the density gradient of the dyed lens can be controlled with excellent reproducibility by providing as desired the integrated heating amount and the integrated heating amount distribution in the heat treatment, and the nonuniform heating required for providing the desired integrated heating amount distribution can be realized by a simple method of controlling the heat irradiation time in dependence on the position within the lens dyeing surface.

While, in the foregoing first, second and third embodiments, the control of the heat irradiation time in dependence on the position within the lens dyeing surface is effected in response to the movement of the movable shielding plate 2, it is possible to arrange so that conversely the lens substrate is moved relative to the fixed shielding plate or alternatively the two may be combined to provide various time variation patterns for the relative displacements of the shielding plate and the lens substrate.

Figure 6A:
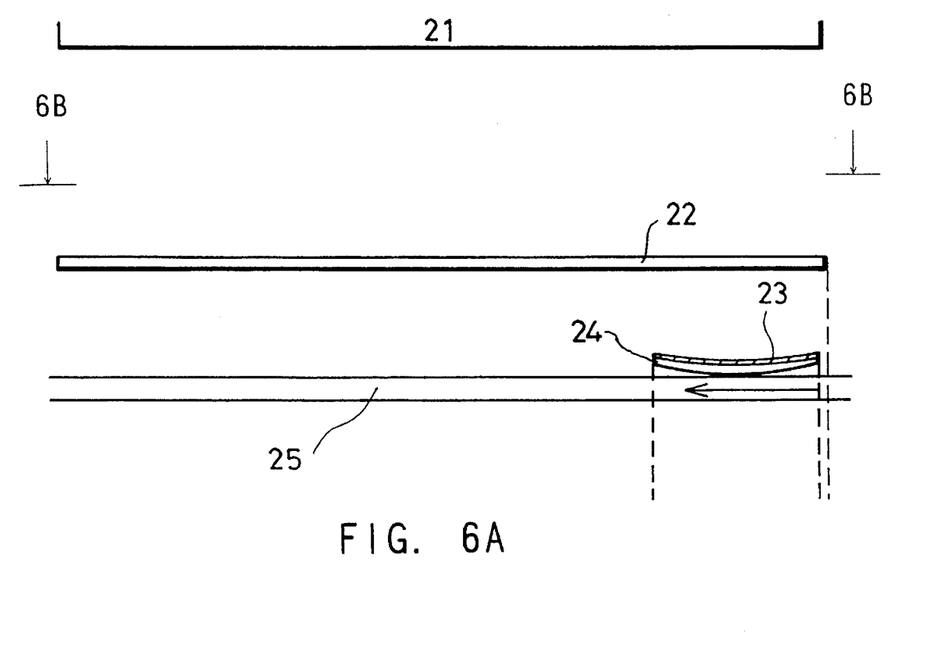
FIG. 6A is a side view schematically showing the manner in which the lens dyeing process according to a fourth embodiment of the present invention is performed.
Figure 6B:
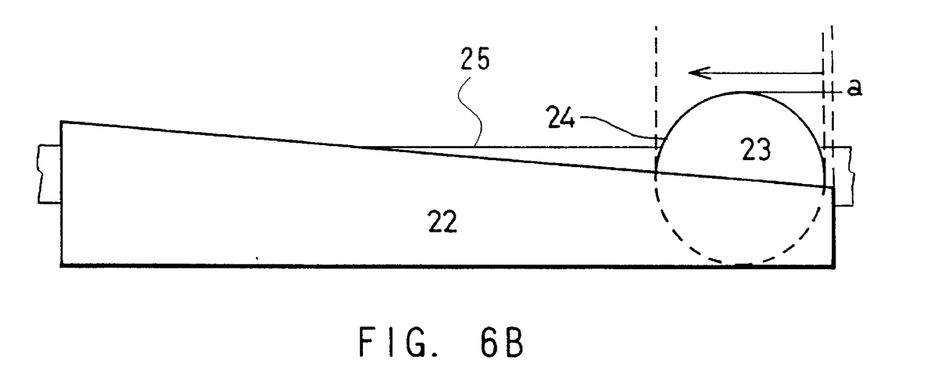
FIG. 6B shows the principal part of FIG. 6A looked from the direction of an arrow 6B in FIG. 6A.

Fourth Embodiment:

FIG. 6 shows a fourth embodiment of the present invention in which a lens substrate 24 is moved relative to a fixed shielding plate 22. More specifically, the lens substrate 24 is supported by a conveyor unit 25 of a belt type or the like so as to be movable at a constant speed, and a wide heater 21 serving as a radiation heating source is fixedly arranged opposite to the conveyor unit 25 to have a heating range corresponding to a predetermined range of movement of the lens substrate 24. Also, fixedly arranged between the heater 21 and the conveyor 25 is a wide heat shielding plate 22 having a trapezoidal shape as shown in FIG. 6B. In the case of this embodiment, in the initial condition a dye coating 23 formed on the surface of the lens substrate 24 as shown in FIG. 6B is shielded from the heat of the heater 21 by the fixed shielding plate 22 with respect to about half the area of the lens surface. When the lens substrate 24 is moved in the direction of an arrow in the Figure by the conveyor 25, the lens surface area subjected to the heat shielding by the shielding plate 22 is gradually increased so that in response to this translational movement, the surface area portion exposed from the shielding plate 22 (this portion is conversely decreased gradually) is irradiated by the radiation heat from the heater 21.

Since the area shielded from the heat radiation of the heating source 21 by the fixed shielding plate 22 is gradually increased in response to the translational movement of the lens substrate 24 in the direction of the arrow in the Figure, the heat irradiation time of the portion is increased and the integrated heating amount is increased as the portion is closer to the upper end a of the lens substrate 24 in FIG. 6. In order to control the color density gradient, it is only necessary to adjust the travel speed of the lens substrate 24 by the conveyor 25 so as to obtain the desired integrated heating amount distribution.

Such translational movement of the lens substrate 24 can be effected by utilizing a part of the conveyor equipment in the continuous production line and therefore the present embodiment is particularly suited for the continuous mass production of dyed lenses having the same density gradient pattern.

Fifth Embodiment:

While, in the previously mentioned embodiments, the heating time is varied in dependence on the position within the lens surface to control the nonuniform heating, in the fifth embodiment of the present invention which will be described hereunder the distance of heat irradiation or the distance from a heating source is varied in dependence on the position within a lens a surface to obtain an integrated heating amount distribution corresponding to the desired color density gradient.

Figure 7:
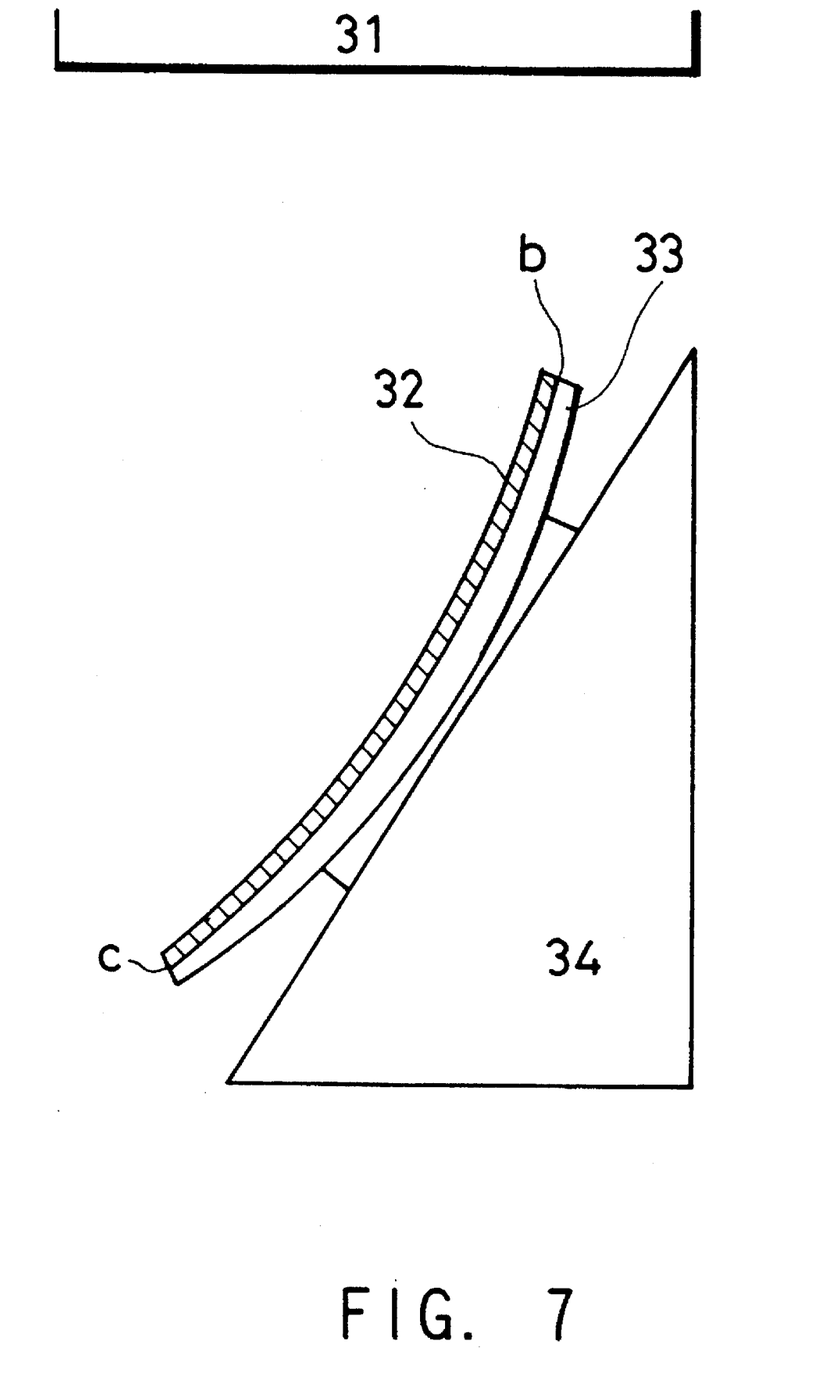
FIG. 7 is a side view schematically showing the manner in which the lens dyeing process according to a fifth embodiment of the present invention is performed.

More specifically, as shown in FIG. 7, a lens substrate 33 is formed with a dye coating 32 on its surface and it is held on a supporting stand 34 in such a manner that the lens surface is inclined at a predetermined angle relative to a radiation heat source 31. The heat is irradiated in this condition. At this time, the upper end b of the lens substrate 33 is nearest to the radiation heat source 31 and the substrate 33 becomes increasingly remote from it toward the lower end c. These differences in the distance from the radiation heat source 31 directly result in a nonuniform distribution of integrated heating amounts and the amounts of adsorption under heating of the dye into the lens substrate 33 from the dye coating 32 result in a nonuniform distribution. Thus, a color density gradient corresponding to the angle of inclination is obtained.

Sixth Embodiment:

In the sixth embodiment of the present invention, the dyeing process by nonuniform heating is performed on an eyeglass plastic lens substrate 44 (CR-39 Polymer: trade name) made from the same material as that of the first embodiment and having a thickness of 2 mm and a diameter of 65 mm. The dyeing solution used is the same brown dyeing solution as the first embodiment and a dye coating 42 is formed on the lens substrate 44 by the lens spinner as shown in FIG. 2 under the same condition as the first embodiment.

Figure 8:
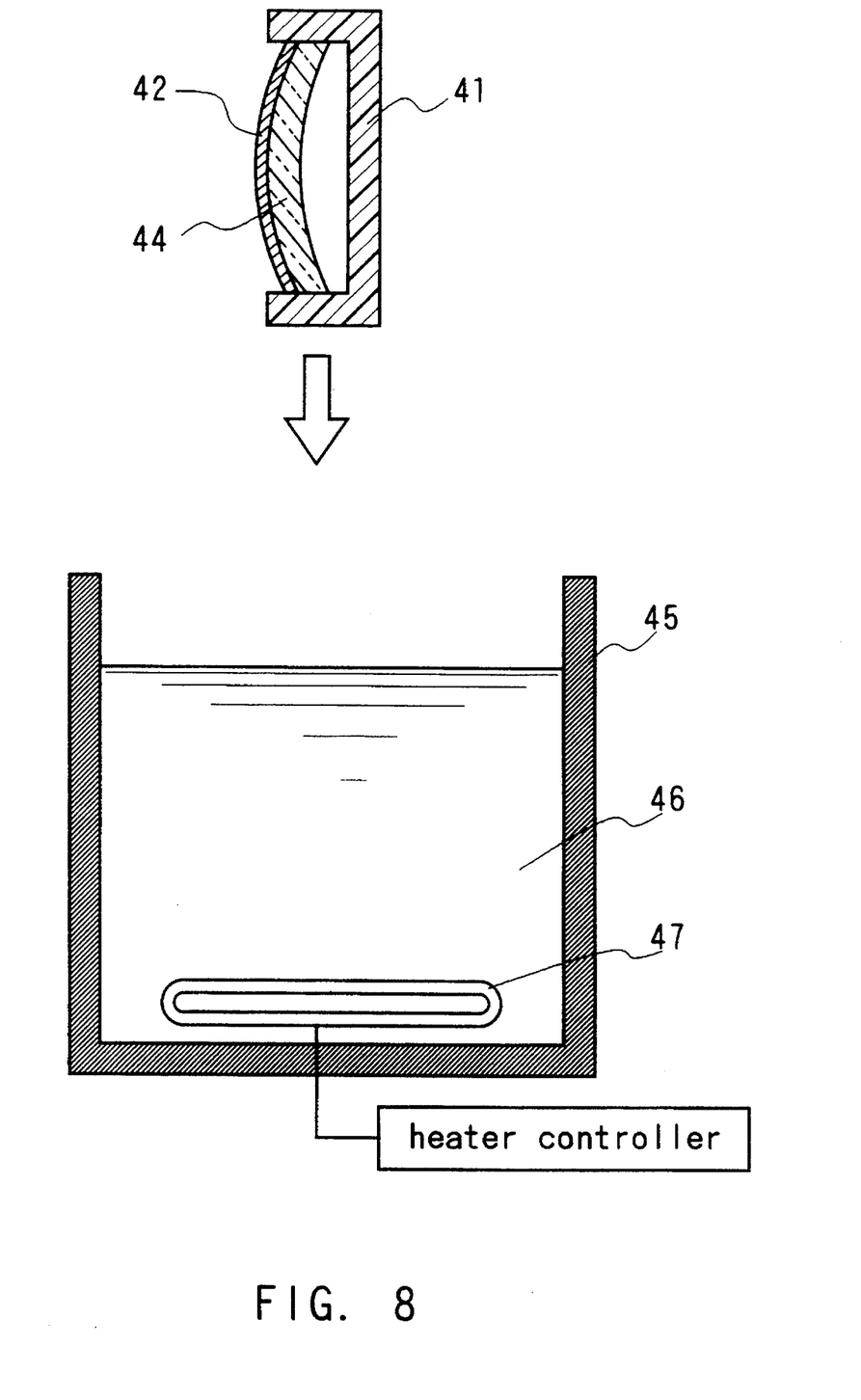
FIG. 8 is a sectional side view schematically showing the manner in which the lens dyeing process according to a sixth embodiment of the present invention is performed.

The lens surface on which said dye coating is not formed and the circumferential surface of the substrate 44 are sealed by a rubber cap 41 as shown in FIG. 8. It is noted that the rubber cap 41 may be substituted by any other cap if it is formed by such material as having durability of corrosion-resistance, anti-chemicals and thermostability against the following heating mediums.

The lens substrate 44 on which said rubber cap is mounted is immersed partly into a heating medium 46 in a heating bath 45 as shown in FIG. 8 and dyed by being periodically moved up and down.

As heating mediums, heat-transfer fluids such as, for example, polyethylene glycol (#400, #600, #1000); XL-100, XL-450 and XL-1000 (trade name: Asahi Denka Kogyo KK) made from polyoxyalkylene glycol; Flourinert FC-40, FC-43, and FC-73 (trade name: Sumitomo 3M Ltd.) made from fluorinated carbon compounds, and the like may be used. And, according to circumstances, heated water may also be used.

The temperature of the heating medium is maintained by a heater 47 to be in the range of 100° to 130° C. within which the lens substrate is not suffered from any heat damage and dyes may preferably be diffused into the lens substrate extremely easily.

Further, as to the heating time, it is preferable to choose it, in heating any dyeing portion of the lens surface, to be more than 1 minute during the time of which dyeing is made even a little, less than 40 minutes during the time of which the dyeing is equilibrated, and the heating time beyond 40 min is substantially meaningless.

In this embodiment, nonuniform heating is effected for 35 minutes at the temperature of 120° C. In this case, the lens substrate 44 on which the rubber cap 41 as shown in FIG. 8 is mounted, is immersed into the heating medium (liquid) 46 from the bottom thereof in the upright position.

The depth of immersion (the depth from the liquid surface of the heating medium to the lower end of the lens substrate) is determined by the size of dyeing area of the lens surface. In this embodiment, the lens substrate 44 immersed in the heating medium is moved up and down in a comparatively slow motion, and the depth of immersion has been varied slowly in the range of a few mm, so that any sharp variation of color density on the lens surface is not occurred, that is, a smooth variation of color density may be acquired. More particularly, in this embodiment, the lens substrate 44 has been immersed into the heating medium 46 at the initial immersion depth of 10 mm from the lower end thereof, then the lens substrate has been raised up to an immersion depth of 8 mm by continuously slow motions for the period 18 min, then put back to the immersion depth of 10 mm again by continuously slow motions for the period of 8 min, then raised up to the immersion depth of 8 mm by continuously slow motions for the period of 3 min, and then raised up to the immersion depth of 4 mm by continuously slow motions for the period of 2 min, whereby the heating treatment has been completed, taking 31 min in total. Then, the lens substrate 44 has been raised up to the outside of the liquid surface of the heating medium 46.

In such a method as mentioned above, the lower area of the lens substrate has been heated ununiformly by the heating medium, by varying the position of the liquid surface of the heating medium on the lens surface periodically and continuously.

After this ununiform heat treatment, the lens substrate 44 has been cleaned in order to remove the remaining dye on the surface thereof without being diffused therein. In this embodiment, the primary and secondary cleaning have been successively effected by rocking it for a period of 1 minute in each of first and second cleaning tanks each being filled with methylene chloride of 20° C. and lastly, the lens is left to stand in the methylene chloride vapor of 40° C. contained in a hermetically sealed tank thereby effecting the final washing.

In the dyeing process in which the lens substrate is immersed in the heating medium, according to the sixth embodiment, it is possible to practise ununiform heating at a simple equipment and manufacture half-dyed lenses at a low cost.

It is to be noted that while the above-described embodiments show the case in which the dyeing coating is formed on the eyepiece-side surface of the lens substrate and the heat is applied onto the dye coating side, the dye coating may be formed on the objective-side lens surface and also the same advantage can be obtained even if the heat is applied onto the backside of the dye coating. Further, the dye coating forming method is not limited to spin coating and it is possible to use the heretofore employed ordinary techniques such as brush-on or spray coating.

What is claimed is:

1. A method for dyeing a plastic optical component, comprising:

applying a dye coating of substantially uniform thickness to an entire surface of a plastic optical component;

heating said entire surface of said optical component which is covered with said dye coating, by radiation from a heating source located spaced apart from said optical component, wherein a substantially equal amount of radiation is irradiated from said heating source to an irradiation region corresponding to all over said entire surface to adsorb a dye in said coating into said optical component, wherein irradiation time of said radiation onto said surface is varied depending on the position of different portions of said surface during a period of heating, and wherein said surface of said optical component is non-uniformly heated and amounts of said dye adsorbed within said surface at a position in said surface is dependent on an amount of the radiation provided from said heating source to said position.

2. A method according to claim 1, comprising:

controlling an amount of heat applied to the surface of said optical component obtaining a heating gradient corresponding to a color density gradient, wherein an amount of said dye adsorbed into said optical component varies according to said color density gradient.

3. A method according to claim 1, further comprising:

forming a scratch-proof coating on an entire surface of said a plastic optical component before applying the dye coating to the entire surface of said plastic optical component.

4. A method according to claim 3, wherein said optical component is a plastic eyeglass lens.

5. A method according to claim 3, wherein said scratch-proof coating is made from an organic silicon compound or its hydrolyzate.

6. A method according to claim 5, wherein said organic silicon compound has a composition of the following general formula:

$$R^1_a R^2_b Si(OR^3)_{4-(a+b)}$$

where $R^1$ is a functional group or organic group having an unsaturated double bond and a number of carbon atoms of 4 to 14, $R^2$ is a hydrocarbon group or halogenated hydrocarbon group of 1 to 6 carbon atoms, $R^3$ is an alkyl group, alkoxyalkyl group or acyl group of 1 to 4 carbon atoms, and a and b are each 1 or 0 so that (a+b)=1 or 2.

7. A method according to claim 1, further comprising:

forming a scratch-proof coating on said surface of said plastic optical component after adsorption of said dye into said plastic optical component.

8. A method according to claim 7, wherein said optical component is a plastic eyeglass lens.

9. A method according to claim 7, wherein said scratch-proof coating is made from an organic silicon compound or its hydrolyzate.

10. A method according to claim 9, wherein said organic silicon compound has its composition of the following general formula:

$$R^1_a R^2_b Si(OR^3)_{4-(a+b)}$$

where $R^1$ is a functional group or organic group having an unsaturated double bond and a number of carbon atoms of 4 to 14, $R^2$ is a hydrocarbon group or halogenated hydrocarbon group of 1 to 6 carbon atoms, $R^3$ is an alkyl group, alkoxyalkyl group or acyl group of 1 to 4 carbon atoms, and a and b are each 1 or 0 so that (a +b)=1 or 2.

11. A method for dyeing a plastic optical component, comprising:

applying a dye coating of substantially uniform thickness to an entire surface of a plastic optical component;

heating said entire surface of said optical component which is covered with said dye coating, by radiation from a heating source located spaced apart from said optical component, wherein a substantially equal amount of radiation is irradiated from said heating source to an irradiation region corresponding to all over said entire surface, to adsorb a dye in said coating into said optical component, arranging a radiation shielding member at a location spaced apart from said surface and between said heating source and said surface, and changing relative position between said shielding member and said optical component to vary an area of said irradiation region on said surface with time during a period of heating, wherein said surface of said optical component is non-uniformly heated and amounts of said dye adsorbed within said surface at a position in said surface is dependent on an amount of the radiation provided from said heating source to said position.

12. A method according to claim 11, comprising:

holding said optical component in a fixed position during a period of heating, and moving said shielding member during the period of heating.

13. A method according to claim 11, comprising:

holding said shielding member in a fixed position during a period of heating, and moving said optical component during the period of heating.

14. A method according to claim 11, wherein said heating source is selected from the group consisting of infrared radiation, visible light radiation, a hot-air source and a microwave irradiation source.

15. A method according to claim 11, wherein said optical component is a plastic eyeglass lens.

16. A method for dyeing a plastic optical component, comprising:

applying a dye coating of substantially uniform thickness to an entire surface of a plastic optical component;

heating said entire surface of said optical component which is covered with said dye coating, with radiation from a heating source located spaced apart from said optical component, wherein a substantially equal amount of radiation is irradiated from said heating source to an irradiation region corresponding to all over said entire surface, to adsorb a dye in said coating into said optical component, wherein an irradiation distance from said heating source is varied depending on position within said surface, and wherein said surface of said optical component is non-uniformly heated and amounts of said dye adsorbed within said surface at a position in said surface is dependent on an amount of the radiation provided to said position.

17. A method according to claim 16, comprising:

inclining the surface of said optical component at an angle with respect to a direction of said radiation from said heating source to said surface.

* * * * *